Aug. 15, 1950     H. E. HERBERT ET AL     2,519,186

SHOPPING BAG CARRIER

Filed April 12, 1949

HARRY E. HERBERT,
FRANK A. NOTTERMAN,
INVENTORS

BY Hazard & Miller

ATTORNEYS.

Patented Aug. 15, 1950

2,519,186

UNITED STATES PATENT OFFICE 2,519,186

SHOPPING BAG CARRIER

Harry E. Herbert, Los Angeles, and Frank A. Notterman, Nevada City, Calif.

Application April 12, 1949, Serial No. 86,964

3 Claims. (Cl. 16—114)

This invention relates to improvements in shopping bag carriers and may be considered as an improvement over the shopping bag carrier disclosed in U. S. Letters Patent No. 2,394,050, filed by Charles A. Goza and now owned by us.

An object of the present invention is to provide an improved shopping bag carrier which can be easily, quickly and economically manufactured and which consists of a generally tubular body which is open from end to end thereof and which has a slotted flat side through which the cords of a shopping bag may be positioned. We have found, if the shopping bag carrier is perfectly round as disclosed in the above mentioned patent, the user thereof frequently turns the carrier in the course of carrying the shopping bag and that some times on turning the carrier upside down the cords can escape through the helical slot. By having the carrier generally semi-cylindrical so that there is a flat side thereon the average user will hold the carrier in proper position, frequently doing so by positioning his thumb against the surface of the flat side and thus maintaining the carrier against rotation. The flat side can also be advantageously employed for the display of advertising medium.

Another object of the invention is to provide an improved carrier which is so designed that it can be readily molded from inexpensive materials such as, for example, synthetic resin plastics which possess a slight degree of resiliency enabling protuberances to be formed at the ends of the slot which restrict the slot adjacent the ends but due to the resiliency of the material the slot can be sprung open sufficiently for the insertion or withdrawal of the cords of the shopping bag.

With the foregoing and other objects in view, which will be made manifest in the following detailed description and specifically pointed out in the appended claims, reference is had to the accompanying drawings for an illustrative embodiment of the invention, wherein:

Figure 1:
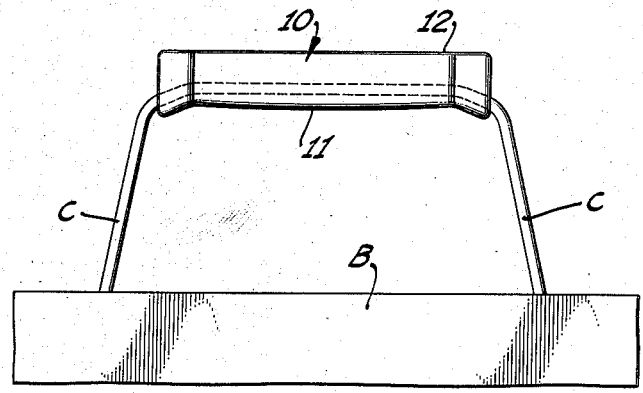
Figure 1 is a view in side elevation of the upper portion of a conventional shopping bag illustrating the carrier in applied position.
Figure 2:
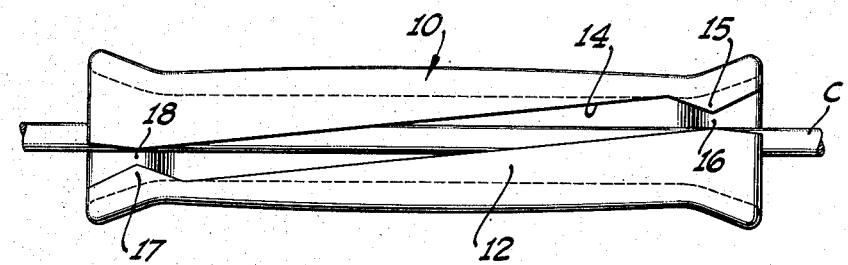
Fig. 2 is a top plan view of the carrier.
Figure 3:
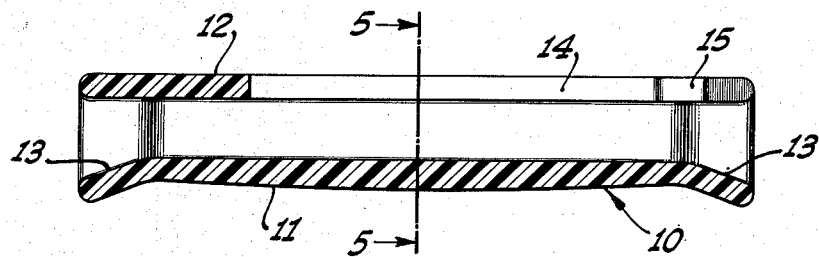
Fig. 3 is a longitudinal vertical section through the carrier.
Figure 4:
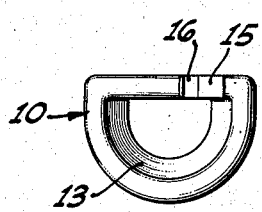
Fig. 4 is an end view in elevation of the carrier.
Figure 5:
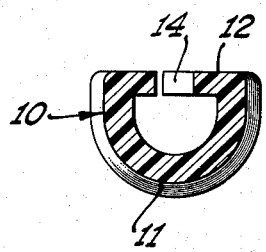
Fig. 5 is a vertical section taken substantially upon the line 5—5 upon Fig. 3.

Referring to the accompanying drawings wherein similar reference characters designate similar parts throughout, B indicates a conventional shopping bag which is equipped with one or more cords C by which the bag can be suspended. The carrier embodying the present invention consists of a tubular body 10 preferably formed of a synthetic resin plastic. This body is generally of semi-cylindrical shape presenting at the bottom thereof a generally semi-cylindrical surface 11 and on the top a flat side 12. The ends of the body may be internally enlarged as indicated at 13 so as to avoid sharp edges against which the cords C will be drawn. In the flat side 12 there is formed a slot 14 which extends from end to end of the flat side and which is arranged at an angle to the longitudinal axis through the carrier. This slot may be regarded as extending from substantially the inner face of one vertical wall of the body to the inner face of the opposite vertical wall at the other end of the body. The width of the slot is slightly greater than the diameter of the cords C throughout the major portion of the length of the slot. However, adjacent one end thereof there is formed an obtuse protuberance 15 which extends toward the opposite side of the slot and cooperates therewith to form a relatively restricted throat 16. Similarly, adjacent the other end of the slot 14 there is an obtuse protuberance 17 which partially projects across the slot and cooperates with the opposite side to form a restricted throat 18. As the material from which the body is formed possesses a slight degree of resiliency, the throats 16 and 18 can be formed so as to be slightly smaller in width than the diameter of the cords on the shopping bag. Thus, in applying the carrier to the cords the slot 14 may be aligned with the lengths of the cords and the cords forced through the slot. Each cord on being forced through the throats 16 and 18 will slightly spread the slot while the cords are entering. Thereafter, due to the inherent resiliency of the plastic the body will return to its normal position.

In use the average person will position his thumb against the top of the flat side 12 and in so doing will maintain the flat side 12 uppermost. Advertising material may be displayed on the flat side 12 if desired. If the carrier should, for some reason, be turned over, on picking up the shopping bag the user will be immediately conscious of the fact that the carrier is in inverted position and will usually take corrective measures to position it properly. However, even if this is not done the cords on engaging the under or interior surface of the flat side 12, will not be guided toward the slot 14 and consequently will not inadvertently or accidentally be caused to slip out of the slot. The application or removal of the carrier to and from the cords of the shopping bag requires a very conscious effort and a proper alignment of the cords with the slot 14.

Various changes may be made in the details of construction without departing from the spirit and scope of the invention as defined by the appended claims.

We claim:

1. A shopping bag carrier comprising a tubular body formed of slightly resilient material and open from end to end thereof, said body having a flat side and being otherwise transversely curved from one edge of said flat side to the other, there being a slot in the flat side extending from end to end thereof and arranged at an angle to the longitudinal axis through the body thus dividing the flat side into complementary tapering flanges overhanging the interior of the body from the sides of the body.

2. A shopping bag carrier comprising a tubular body formed of slightly resilient material and open from end to end thereof, said body having a flat side and being otherwise transversely curved from one edge of said flat side to the other, there being a slot in the flat side extending from end to end thereof and arranged at an angle to the longitudinal axis through the body thus dividing the flat side into complementary tapering flanges overhanging the interior of the body from the sides of the body, the edges of the slot adjacent the ends thereof having obtuse protuberances extending toward the opposite sides of the slot and cooperating therewith to form restricted throats adjacent the ends of the slot.

3. A shopping bag carrier comprising a tubular body open from end to end thereof, said body being generally of semi-cylindrical shape and presenting a flat top surface, there being a slot formed in said flat top surface extending from end to end of the body and arranged at an angle to the longitudinal axis of the body thus dividing the flat top of the body into complementary tapering flanges overhanging the interior of the body from the sides thereof.

HARRY E. HERBERT.
FRANK A. NOTTERMAN.

REFERENCES CITED

The following references are of record in the file of this patent:

UNITED STATES PATENTS

| Number | Name | Date |
| --- | --- | --- |
| 1,460,354 | Carver | June 26, 1923 |
| 1,576,546 | Ransom | Mar. 16, 1926 |
| 2,394,050 | Goza | Feb. 5, 1946 |
| 2,444,558 | Elliott | July 6, 1948 |